(12) United States Patent
Chaar et al.

(10) Patent No.: US 6,501,766 B1
(45) Date of Patent: *Dec. 31, 2002

(54) GENERIC BUS SYSTEM

(75) Inventors: Melhem I. Chaar, Gloucester (CA); George F. Irwin, Kanata (CA); James L. Watchorn, Nepean (CA); David A. Fisher, Kanata (CA); Michael F. Kemp, Stittsville (CA); Osama Bahgat, Petaluma, CA (US)

(73) Assignee: Northern Telecom Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,246

(22) Filed: Mar. 30, 1998

(51) Int. Cl.⁷ .................. H04L 12/40; G06F 13/42; G06F 13/38
(52) U.S. Cl. .................. 370/458; 370/257; 370/443; 370/462
(58) Field of Search .................. 370/319, 321, 370/351, 347, 348, 362, 375, 376, 439, 440, 442, 443, 458, 462, 475, 498, 255, 257, 364, 365

(56) References Cited

U.S. PATENT DOCUMENTS

| | | | | |
|---|---|---|---|---|
| 4,750,171 A | * | 6/1988 | Kedar et al. | 370/445 |
| 4,809,270 A | * | 2/1989 | Baxter et al. | 370/458 |
| 5,046,064 A | | 9/1991 | Suzuki et al. | |
| 5,177,737 A | | 1/1993 | Daudelin et al. | |
| 5,506,969 A | * | 4/1996 | Wall et al. | 710/107 |
| 5,687,326 A | | 11/1997 | Robinson | 395/285 |
| 5,719,858 A | * | 2/1998 | Moore | 370/347 |
| 5,719,860 A | * | 2/1998 | Maison et al. | 370/347 |
| 5,875,309 A | * | 2/1999 | Itkowsky et al. | 710/113 |
| 5,953,344 A | * | 9/1999 | Dail et al. | 370/443 |
| 6,011,801 A | * | 1/2000 | Solomon | 370/439 |

FOREIGN PATENT DOCUMENTS

WO   WO 96/41274   12/1996

* cited by examiner

Primary Examiner—Hassan Kizou
Assistant Examiner—Ahmed Elallam
(74) Attorney, Agent, or Firm—Pearne & Gordon LLP

(57) ABSTRACT

A communication system consisting of a number of modules that communicate with one another through a shared communications bus which accommodates different protocols. The system includes a bus clock for defining a frame having a plurality of time slots for communicating signals on the bus; and a bus management algorithm for specifying a receive assignment definition and a transmit assignment definition. The receive assignment definition defines a receive channel for each of the modules representing a set of the time slots, where the modules receive signals from the bus during the set of time slots prescribed by the receive channel. The transmit assignment definition defines a transmit channel for each of the modules representing a set of the time slots, where the modules transmit signals to the bus during the set of time slots prescribed by the transmit channel.

31 Claims, 14 Drawing Sheets

GENERIC BUS SYSTEM

FIELD OF THE INVENTION

This invention relates to the field of multipurpose bus systems, and more particularly to a communication system where a variety of modules communicate with one another using different protocols through a shared communications bus.

BACKGROUND OF THE INVENTION

Many complex electric systems require a plurality of buses to accommodate different schemes for communications between individual modules. These schemes can be, for example, a time-division-multiplexed scheme and a data packetized scheme, where each scheme is associated with a different bus configuration. External devices together with the internal modules intercommunicate over a plurality of system buses. An example of four such buses are: a time division bus, a packet bus, a serial control bus and an address/data bus. These different buses are utilized to facilitate different types of communications.

FIG. 1 illustrates a representation of a traditional multiple bus system 10 for establishing communications between two modules 12A and 12B. The modules 12A and 12B traditionally required specific and specialized interfaces to communicate with one another. In particular, the system 10 includes a plurality of dedicated buses: a transmit datapath bus 14, a receive datapath bus 16, a control signal bus 18, a status bus 20, and a microprocessor bus 22. These dedicated buses define paths that tend to be slow speed and idle most of the time therefore resulting in generally inefficient communication between the modules 12.

A prior art solution for replacing a plurality of buses with a type of multipurpose bus is disclosed in U.S. Pat. No. 5,177,737 issued Jan. 5, 1993 titled Multipurpose Bus System. This patent teaches a multipurpose bus of a predetermined number of leads, as opposed to a plurality of buses individually comprising a different number of leads. In particular, the multipurpose bus includes a lead to carry a superframe signal; a lead to carry a clock signal; four leads for assignment; and a variable number of leads as the main bus. A bus manager is used to control the use of the bus in a time-sharing manner. For example, the bus manager could allocate 60% of the time to have the variable leads of the bus configured as a time division bus, 11% as a packet bus, 4% as a serial control bus and 25% as an address/data bus.

To accomplish this division of bus usage, the bus manager assigns time slices on a frame for the specific type of protocol. For example, 154 time slices can be assigned during which the bus is used as a time division bus, 30 time slices as a packet bus, eight time slices as a serial control bus and 64 time slices as an address/data bus. As a result, during the time slices when the bus is assigned to be configured as a time division bus, the modules having time division interfaces are electrically connected to the bus and modules lacking time division interfaces are disabled.

Although the multipurpose bus of the '737 patent supports the interconnection of modules having various communication protocols requiring different buses, the overhead and planning required to actually configure the bus for certain types of traffic from specific modules make it unsuitable for high speed (622 MHz–1.2 Hz) switching applications, for example.

SUMMARY OF THE INVENTION

An object of the present invention is to provide a generic bus system where a plurality of modules can communicate with one another using different protocols through a shared communications bus.

In accordance with an aspect of the present invention there is provided a communication system wherein a plurality of modules communicate with one another using different protocols through a shared communications bus which said system comprising: means for defining a frame having a plurality of time slots for communicating signals on the bus; and means for specifying a receive assignment definition and a transmit assignment definition, said receive assignment definition defining a receive channel for each of the modules representing a set of the time slots, wherein said modules receive signals from the bus during the set of time slots prescribed by the receive channel; said transmit assignment definition defining a transmit channel for each of the modules representing a set of the time slots, wherein said modules transmit signals to the bus during the set of time slots prescribed by the transmit channel.

In accordance using another aspect of the present invention there is provided a communication system comprising: a data bus; a plurality of modules communicating over the data bus with different communication protocols; a clock bus providing a clock signal and a framing signal for defining a frame having a plurality of time slots for communicating signals on the data bus; and a bus management algorithm for specifying a receive assignment definition and a transmit assignment definition, said receive assignment definition defining a receive channel for each of the modules representing a set of the time slots, wherein said modules receive signals from the bus during the set of time slots prescribed by the receive channel; said transmit assignment definition defining a transmit channel for each of the modules representing a set of the time slots, wherein said modules transmit signals to the bus during the set of time slots prescribed by the transmit channel.

In accordance with another aspect of the present invention there is provided a method for use in a communication system wherein a plurality of modules communicate with one another using different protocol through a shared communications bus which said method comprising the steps of: defining a frame having a plurality of time slots for communicating signals on the bus; and specifying a receive assignment definition and a transmit assignment definition, said receive assignment definition defining a receive channel for each of the modules representing a set of the time slots, wherein said modules receive signals from the bus during the set of time slots prescribed by the receive channel; said transmit assignment definition defining a transmit channel for each of the modules representing a set of the time slots, wherein said modules transmit signals to the bus during the set of time slots prescribed by the transmit channel.

DETAILED DESCRIPTION OF EMBODIMENTS OF THE INVENTION

Figure 1:
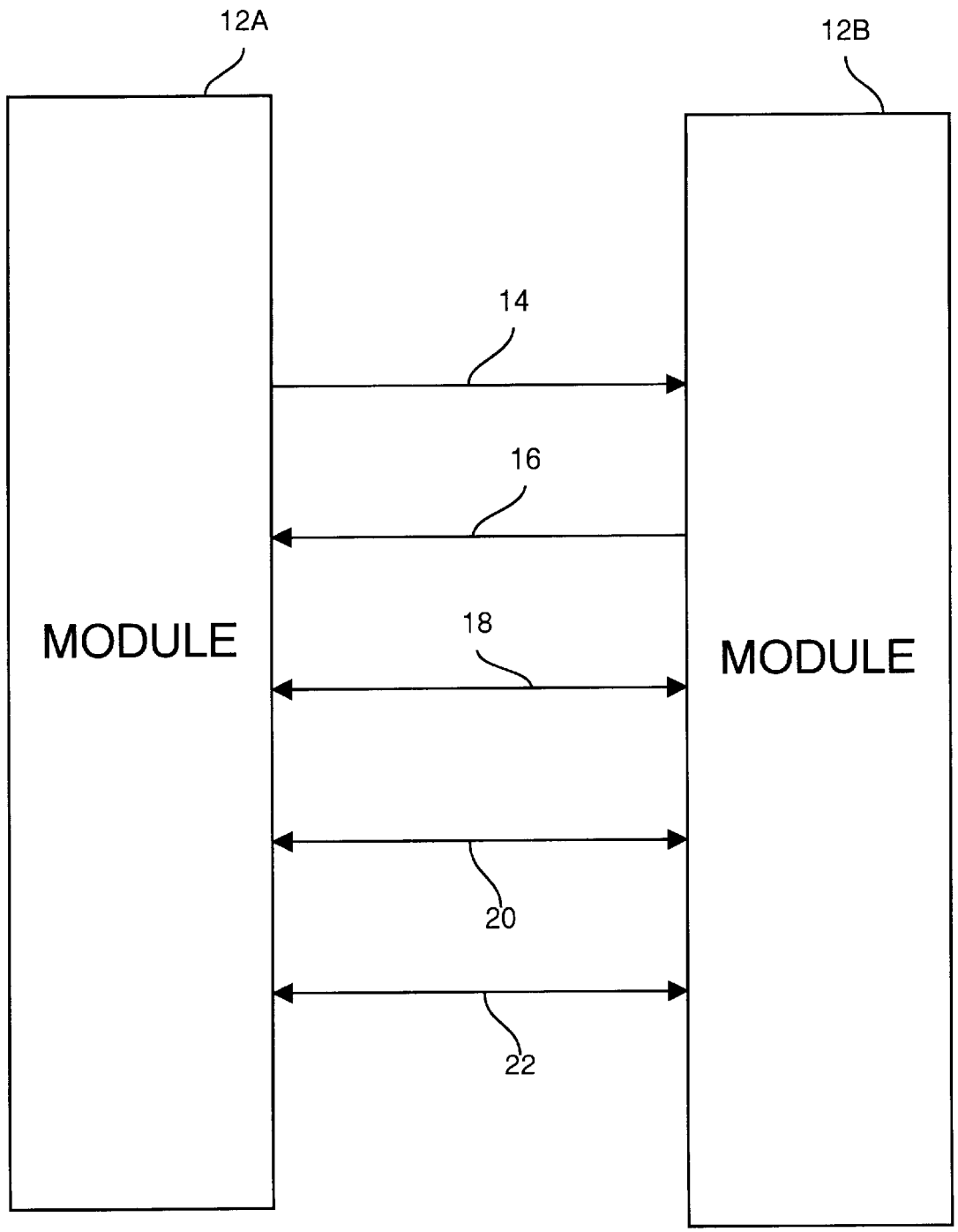
FIG. 1 is a block diagram illustrating a traditional multibus approach for establishing a communication link between two modules.
Figure 2:
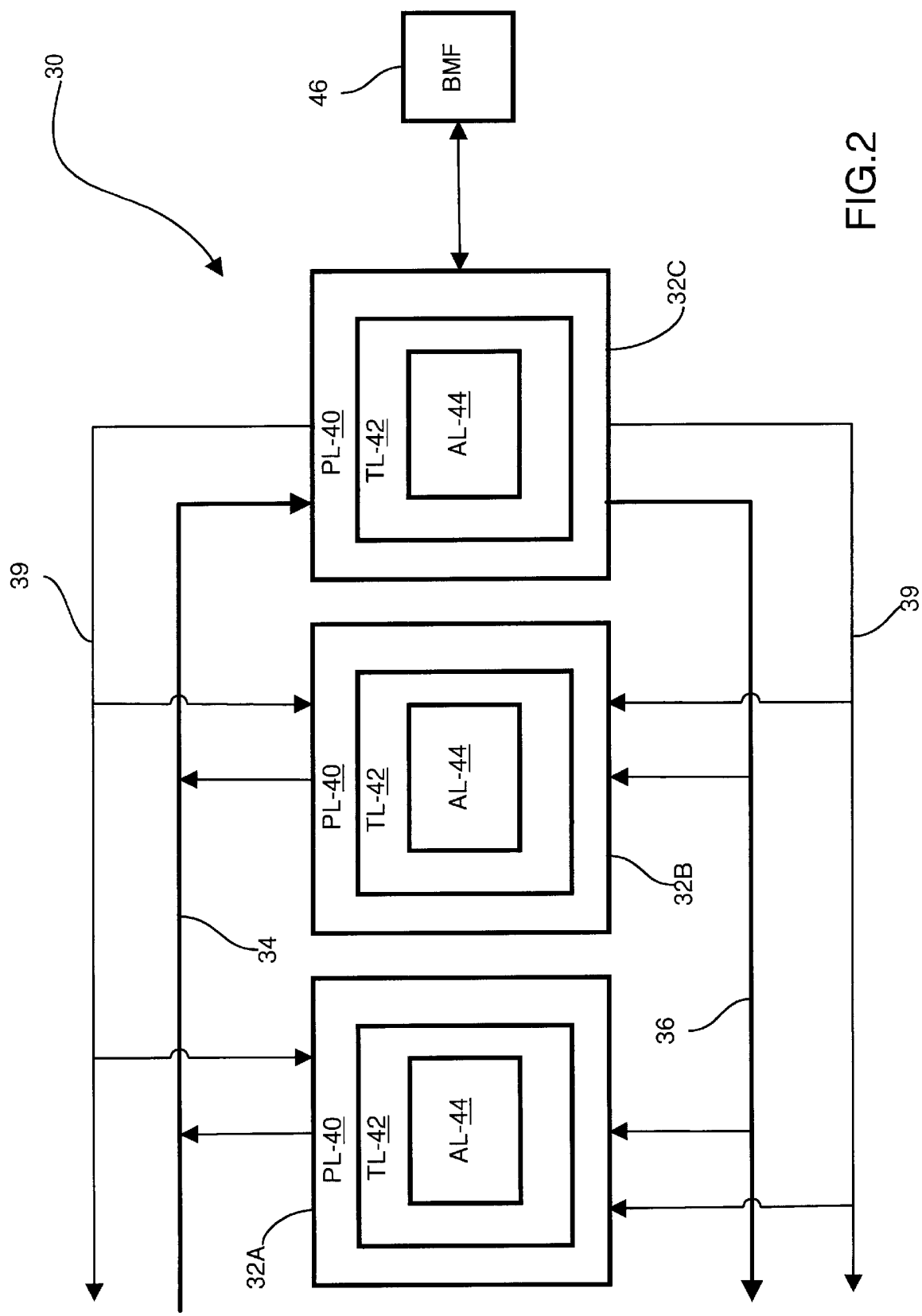
FIG. 2 is a block diagram illustrating a generic bus system according to the present invention.

FIG. 2 illustrates a generic bus system 30 according to the present invention to carry communication traffic between a plurality of modules 32A, 32B and 32C. The bus system 30 includes a unidirectional narrowcast bus (NB) trunk 34, a unidirectional broadcast bus (BB) trunk 36, and a bus clock 39 provided by module 32C. The modules 32 represent circuit packs that perform well-defined functions (e.g. connection controller, queue manager, embedded processor, and the like) for a system, and work together to realise various system capabilities, such as providing switching capabilities in a packet switch (such as asynchronous transfer mode (ATM) switches).

Each module 32 includes a physical layer (PL) 40, a transport layer (TL) 42, and an application layer (AL) 44. Module 32C communicates with a bus management function (BMF) 46 to provide information to the modules 32, through module 32C, to manage the traffic generated by the modules 32 over the NB trunk 34 and the BB trunk 36. The BMF 46 is shown remotely located relative to the module 32C to simplify discussion. The BMF 46 can also reside within any one of the modules 32.

Figure 3:
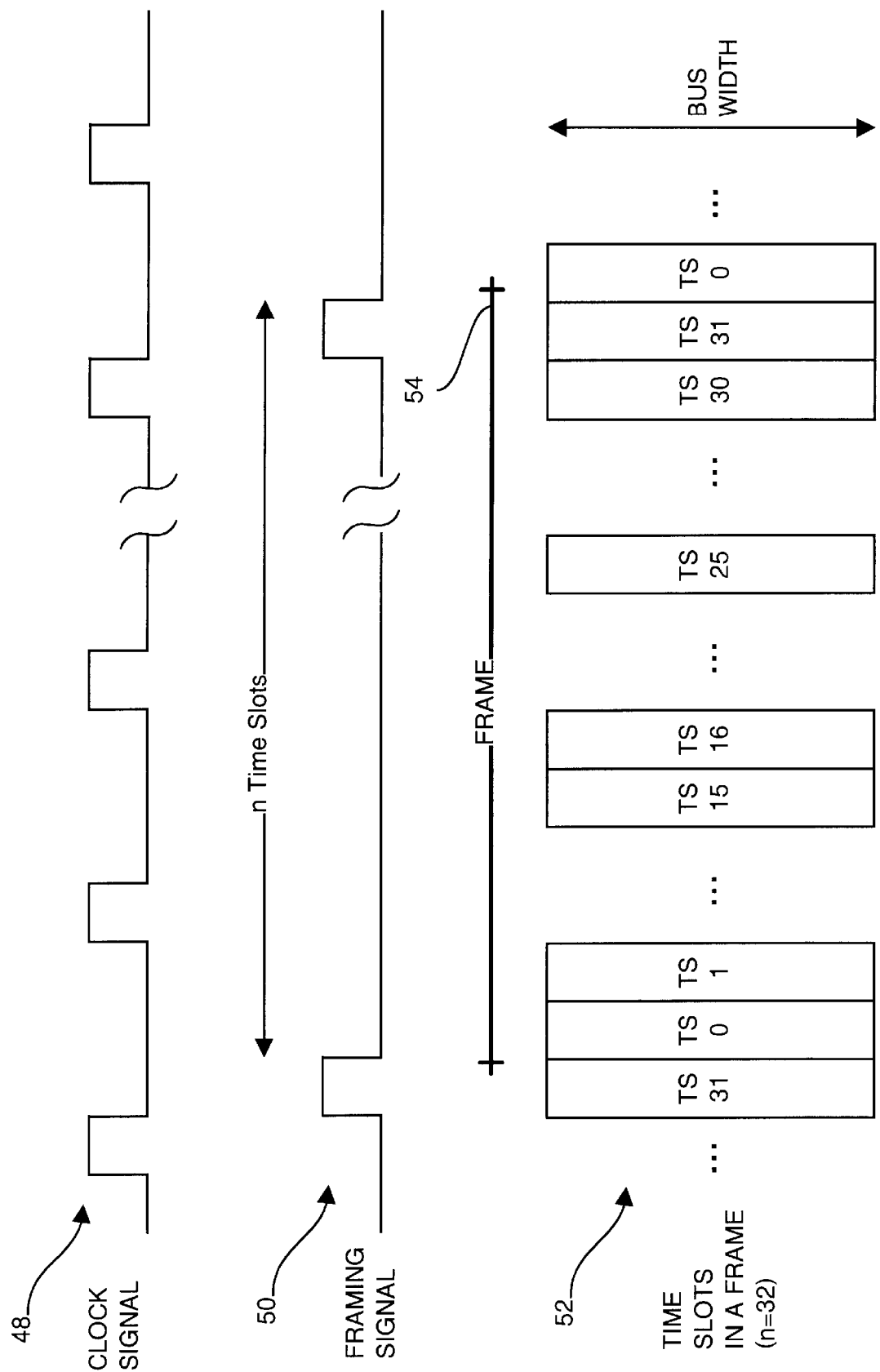
FIG. 3 is a timing diagram of the clock and framing signal from the bus clock of FIG. 2 and the formation of a frame and time slots.

The bus clock 39 is physically one signal that includes a clock signal 48 (shown in FIG. 3) running at ¼ of the speed of the trunks 34 and 36. A framing signal 50 is an internal, periodic signal distributed to all modules 32 on the trunks 34 and 36 to provide synchronization for the system 30. The framing signal 50 is n-clock pulses wide, where n represents the number of time slots (TS) 52 in a frame 54. The size of the frame 54 is flexibly assigned based on the application.

To simplify the remaining portion of the application, n is assigned a value of 32. The width of each time slot 52 is equal to the width of the bus trunks 34 and 36. In summary, the framing signal 50 indicates the beginning of the transmission of the frame 54 consisting of 32 time slots 52, numbered TS0, TS1, . . . ,TS30, TS31.

The physical layer 40 includes services such as initialization and module discovery (ID) to set-up the NB trunk 34 and the BB trunk 36 after power-up or after a hardware reset.

The main items that require initialization are: defining default input and output frame control maps; and synchronous and label mapping tables. Details of these maps and tables are discussed below.

The application layer 44 supports application services for the module and varies depending on the requirements of the system. For example, for an ATM switch the application services include ATM header recognition, standard cyclic redundancy check (CRC), and scheduler engines.

Figure 4A:
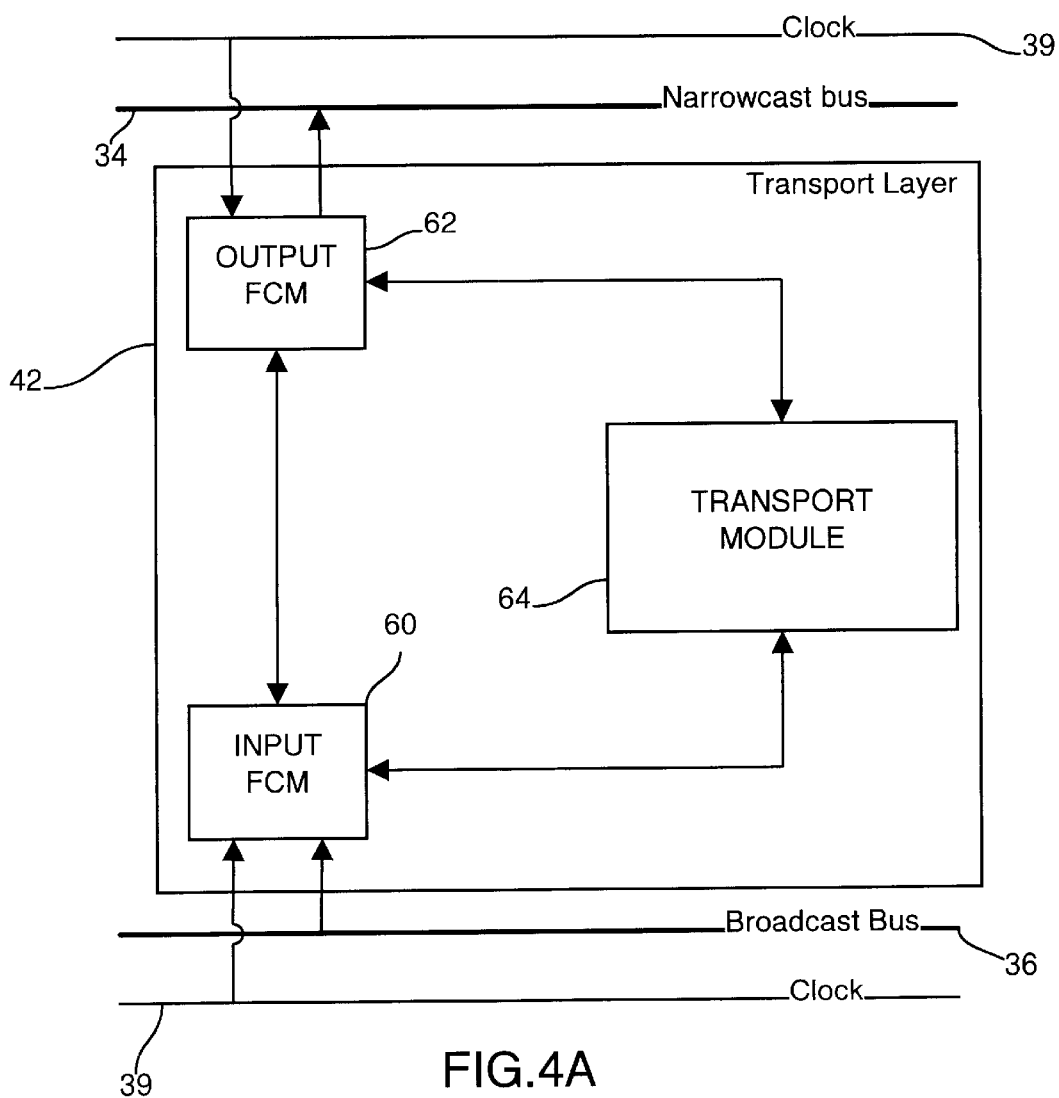
FIG. 4A is a block diagram illustrating the transport layer of a module.

A block diagram of the transport layer 42 of the modules 32 is shown in FIG. 4A. The transport layer 42 includes an input frame control map (IFCM) 60 and an output frame control map (OFCM) 62 both of which are in communication with each other and with a transport module 64. The IFCM 60 and the OFCM 62 have information, in a discrete table format, for each time slot 52 that includes an instruction that represents an action type. There are two operating actions (i.e. operations other than the physical layer ID services discussed above) for the IFCM 60 and two actions for the OFCM 62:

(1) for the IFCM 60 the two actions are: (a) receive information from the BB trunk 36 during a particular time slot 52 or (b) ignore information on the BB trunk 36 during a particular time slot 52; and (2) for the OFCM 62 the two actions are: (a) send information to the NB trunk 34 during a particular time slot 52 (termed "driving" the time slot) or (b) do not send information to the NB trunk 34 during a particular time slot 52.

The clock signal 48 is fed into the IFCM 60 and the OFCM 62 from the clock bus 39 to provide synchronization as discussed above.

Figure 4B:
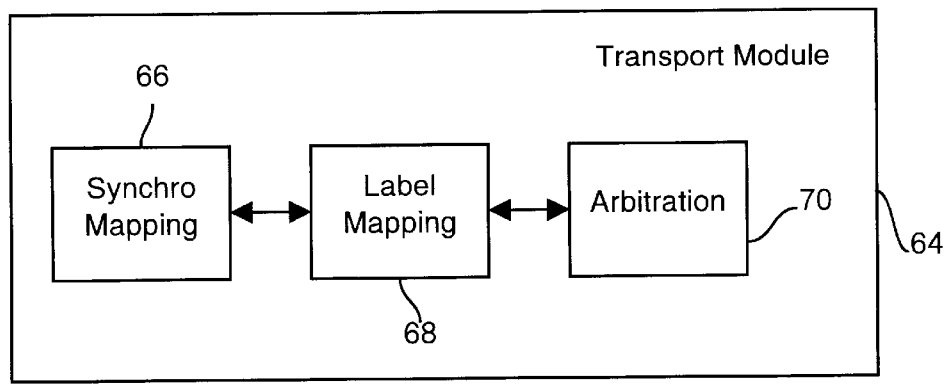
FIG. 4B is a block diagram illustrating the transport module of the transport layer shown in FIG. 4A.

In summary, the IFCM 60 of a particular module 32 essentially notifies the module when to receive traffic from the broadcast bus trunk 36, and the OFCM 62 of a particular module essentially notifies the module when to transmit traffic out on the narrowcast bus trunk 34. FIG. 4B illustrates a block diagram of the components of the transport module 64. The transport module 64 includes a synchronous mapping (SM) service 66, a label (asynchronous) mapping (LM) service 68 and a channel arbitration (ARB) service 70. The transport module 64 provides two primary approaches to carry a message between modules 32 over the trunks 34 and 36: (1) synchronous mapping using the SM service 66 and (2) label mapping using the LM 68 and the ARB 70 services. A detailed discussion of synchronous and label mapping are discussed below.

Figure 5:
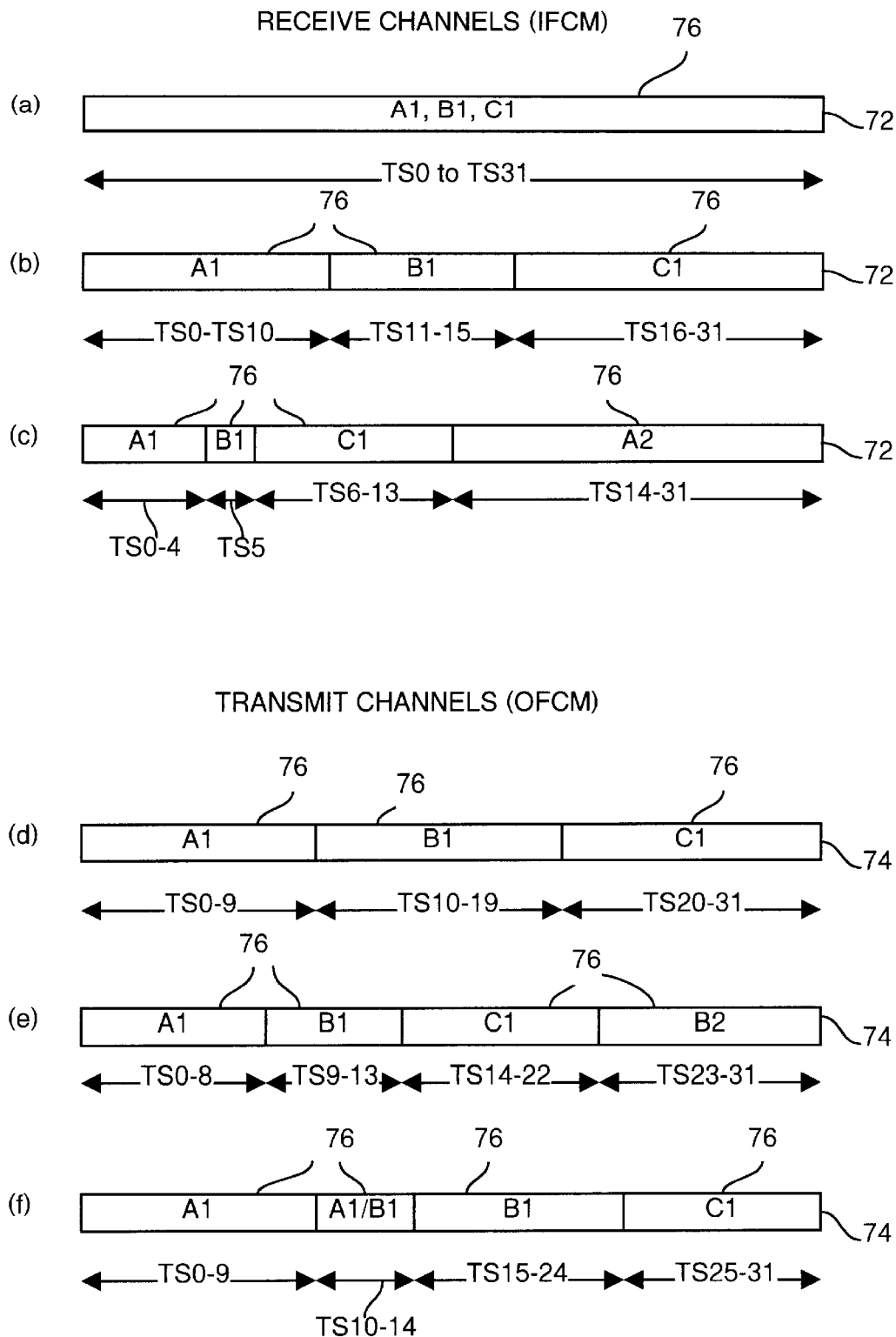
FIG. 5 illustrates a series (a–f) of channel assignment definitions used to distribute bandwidth between the modules for both receiving (a–c) and transmission (d–f) operations.

FIG. 5 illustrates a series of block diagrams used to represent the allocation of bandwidth on the trunks 34 and 36 between the modules 32 of the system 30 for both receiving and transmitting functions. The IFCMs 60 of the modules 32 are provided with information from a receive assignment definition 72 (e.g. FIGS. 5a, b and c), and the OFCMs 62 of the modules 32 are provided with information from a transmit assignment definition 74 (e.g. FIGS. 5d, e and f). The receive and transmit definitions 72, 74 are specified by the BMF 46, based on application dependent requirements, and are transmitted either directly to the FCMs 60, 62 or are provided with information from the definitions 72, 74 through the BB trunk 36 during the initialization function as discussed above in relation to the physical layer 40.

A channel 76 is defined as a set (one or more) of time slots 52 assigned to the modules 32 of the system 30 in the frame 54 that indicates when the modules 32 can receive and transmit data from and to the trunks 34 and 36. The size of the channels 70 are determined by the application based on the needs of the modules 32.

FIG. 5a illustrates an example of the receive assignment definition 72 where each module 32A–C is assigned a channel (A1, B1, C1) that includes a time slot set {TS0, ..., TS31}. In this example, the IFCMs 60 of the modules 32 are advised that they are to receive instructions during all 32 time slots 52 in the frame 54. FIG. 5b illustrates another example of the receive assignment definition 72 where the modules 32 are assigned a set of distinct time slot sets for receiving information from the trunk 36. In particular, channel A1 (for module 32A) is defined by a set of time slots {TS0,TS1, ..., TS10}, channel B1 (for module 32B) is defined by a set of time slots {TS11,TS12, ..., TS15} and channel C1 (for module 32C) is defined by a set of time slots {TS16,TS17, ... TS31 }. In this example, module 32B will only receive information during time slots defined by channel B1 (i.e. TS11–15). The module 32C will ignore all other time slots.

FIG. 5c illustrates another example of the receive assignment definition 72 where one of the modules 32A is assigned a distributed group of two sets of time slots across two channels 76 (A1 and A2). In particular, channel A1 (for module 32A) is defined by a set of time slots {TS0,TS1, ... TS4}, channel B1 (for module 32B) is defined by a time slot set {TS5} (note that one time slot can define a channel and is termed a set), channel C1 (for module 32C) is defined by a set of time slots {TS6, TS7, ..., TS13}, and channel A2 (for module 32A) is defined by a set of time slots {TS14, TS15, ..., TS31}. Therefore, module 32A will receive information from the BB trunk 36 during the time slots {TS0, ..., TS4} and {TS14, ..., TS31} of the frame 54.

FIG. 5d illustrates an example of the transmit assignment definition 74 where the modules 32 are assigned a prescribed number of time slots 52 on the NB trunk 34 for transmission of information. In particular, channel A1 (for module 32A) is defined by a set of time slots {TS0,TS1, ..., TS9}, channel B1 (for module 32B) is defined by a set of time slots {TS10,TS11, ..., TS19}, and channel C1 (for module 32C) is defined by a set of time slots {TS20,TS21, ..., TS31}. In this example, module 32B will drive time slots TS10–TS19 as defined by channel B1. The channels 76 can be viewed as defining bandwidth distribution between the modules 32. In FIG. 5d the bandwidth distribution between the modules 32 is: module 32A (10/32)-31.25%, module 32B (10/32)-31.25%, and module 32C (12/32)-37.5%.

FIG. 5e illustrates another example of the transmit assignment definition 74 where one of the modules 32B is assigned a distributed group of two sets of time slots across two channels B1 and B2. In particular, channel A1 (for module 32A) is defined by a set of time slots {TS0,TS2, ..., TS8}, channel B1 (for module 32B) is defined by a set of time slots {TS9,TS10, ..., TS13}, channel C1 (for module 32C) is defined by a set of time slots {TS14,TS15, ..., TS22}, and channel B2 (also for module 32B) is defined by a set of time slots {TS23,TS24, ..., TS31}. In this example, module 32B will drive time slots TS9 to TS13 and TS23 to TS31 as defined by channels B1 and B2. In FIG. 5e the bandwidth distribution between the modules 32 is: module 32A (9/32) 28.125%, module 32B (14/32) 43.75% distributed, and module 32C (9/32) 28.125%.

FIG. 5f illustrates another example of the transmit assignment definition 74 where two modules 32A and 32B share a set of time slots 52 (i.e. share all or a portion of a channel). In particular, channel A1 (for module 32A) is defined by a set of time slots {TS0,TS1, ..., TS10, TS11, TS12, TS13, TS14}, channel B1 (for module 32B) is defined by a set of time slots {TS10, TS11, TS12, TS13, TS14, ..., TS23, TS24}, and channel C1 (for module 32C) is defined by a set of time slots {TS25,TS26, ..., TS31}. Channel A1/B1 is defined as a set of time slots {TS10, ..., TS14} to be shared by modules 32A and 32B.

In FIG. 5f the bandwidth distribution between the modules 32 is: module 32A (10/32) 31.25% full; (5/32) 15.625% shared, module 32B (10/32) 31.25% full; (5/32) 15.625% shared, and module 32C (7/32) 21.875%. In this example, the right to drive shared time slots TS10–TS14 is arbitrated by the arbitration service 70 of the transport module 64 in the transport layer 42. A detailed example of channel arbitration will be discussed below in the context of a specific example.

Example-Synchronous Mapping

Figure 6:
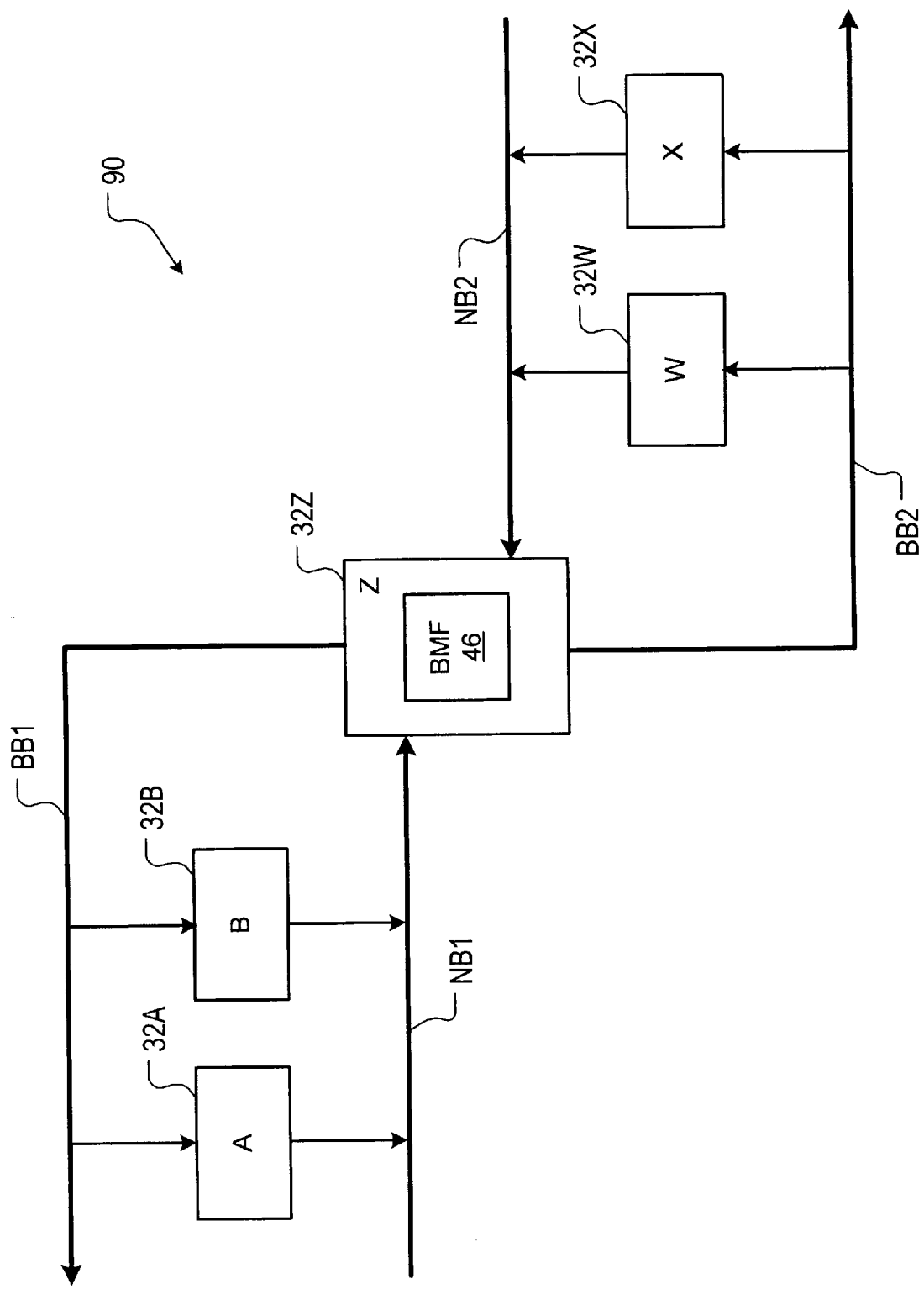
FIG. 6 is a block diagram illustrating a switch topography to describe synchronous mapping.

Synchronous mapping refers to a specific time slot 52 or channel 76 that is mapped from a specific location in a narrowcast frame (i.e. the frame 54 on the narrowcast bus 34), to a specific location in a broadcast frame (i.e. the frame 54 on the broadcast bus 36). A packet switch topography 90 incorporating the generic bus system 30 of the present invention is shown in FIG. 6 to illustrate an example of the synchronous mapping. The switch 90 includes a pair of narrowcast buses NB1 and NB2 and a pair of broadcast buses BB1 and BB2 connected to a module 32Z that includes the BMF 46. Modules 32A and 32B are connected between NB1 and BB1. Modules 32W and 32X are connected between NB2 and BB2. The clock bus 39 is not shown in FIG. 6 to simplify the drawing.

Figure 7:
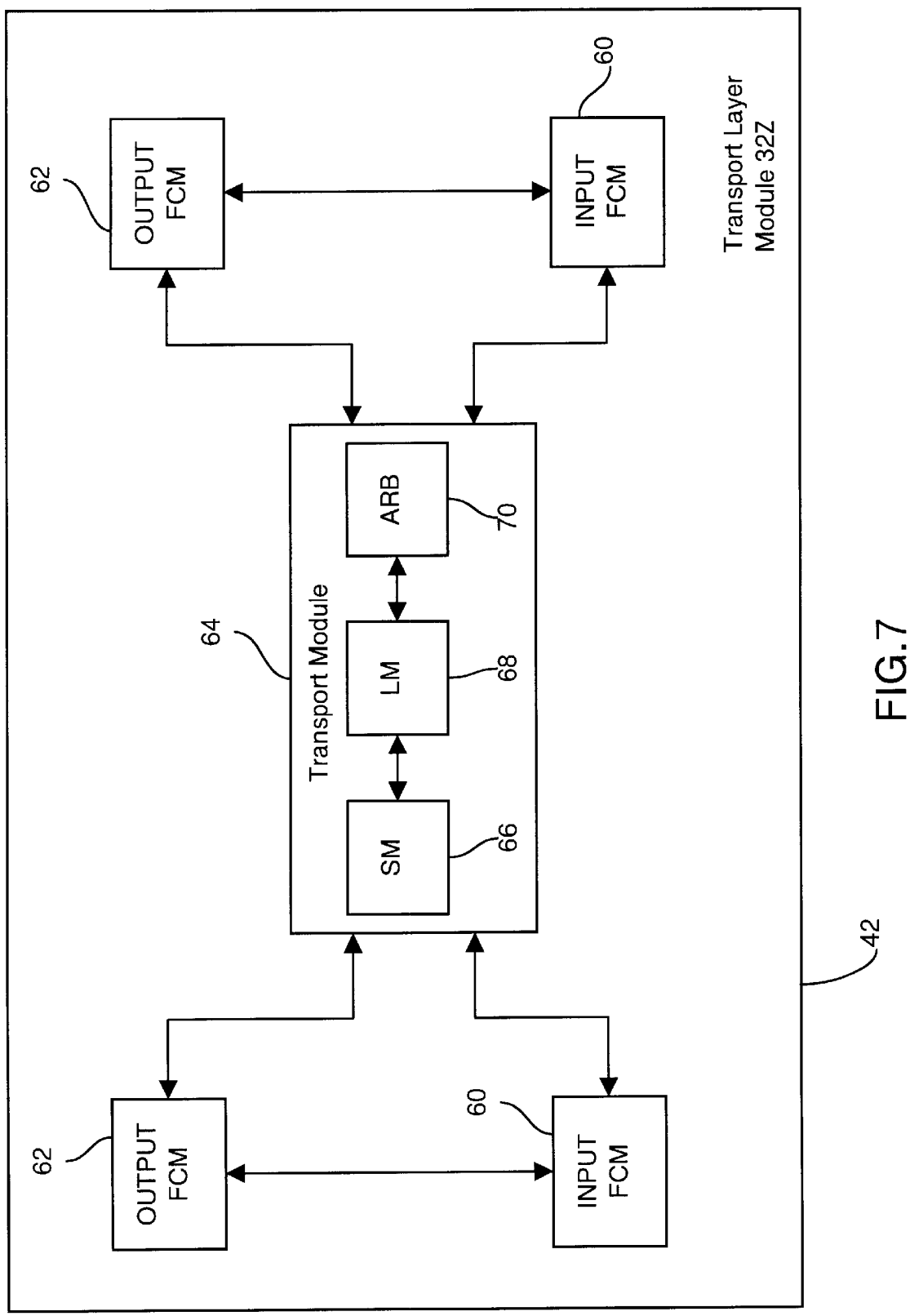
FIG. 7 is a block diagram illustrating the transport layer for a particular module in FIG. 6.

FIG. 7 illustrates a block diagram of the transport layer of module 32Z. The transport layer 42 includes a pair of IFCMs 60 and a pair of OFCMs 62 that exchange information with the transport module 64 that includes the SM 66, LM 68 and ARB 70 services. As previously discussed in conjunction with FIG. 3, the transport layer 42 provides two primary approaches to carry a message between the modules 32 over the trunks NB1,2 and BB1,2: (1) synchronous mapping and (2) label mapping with arbitration.

Figure 8:
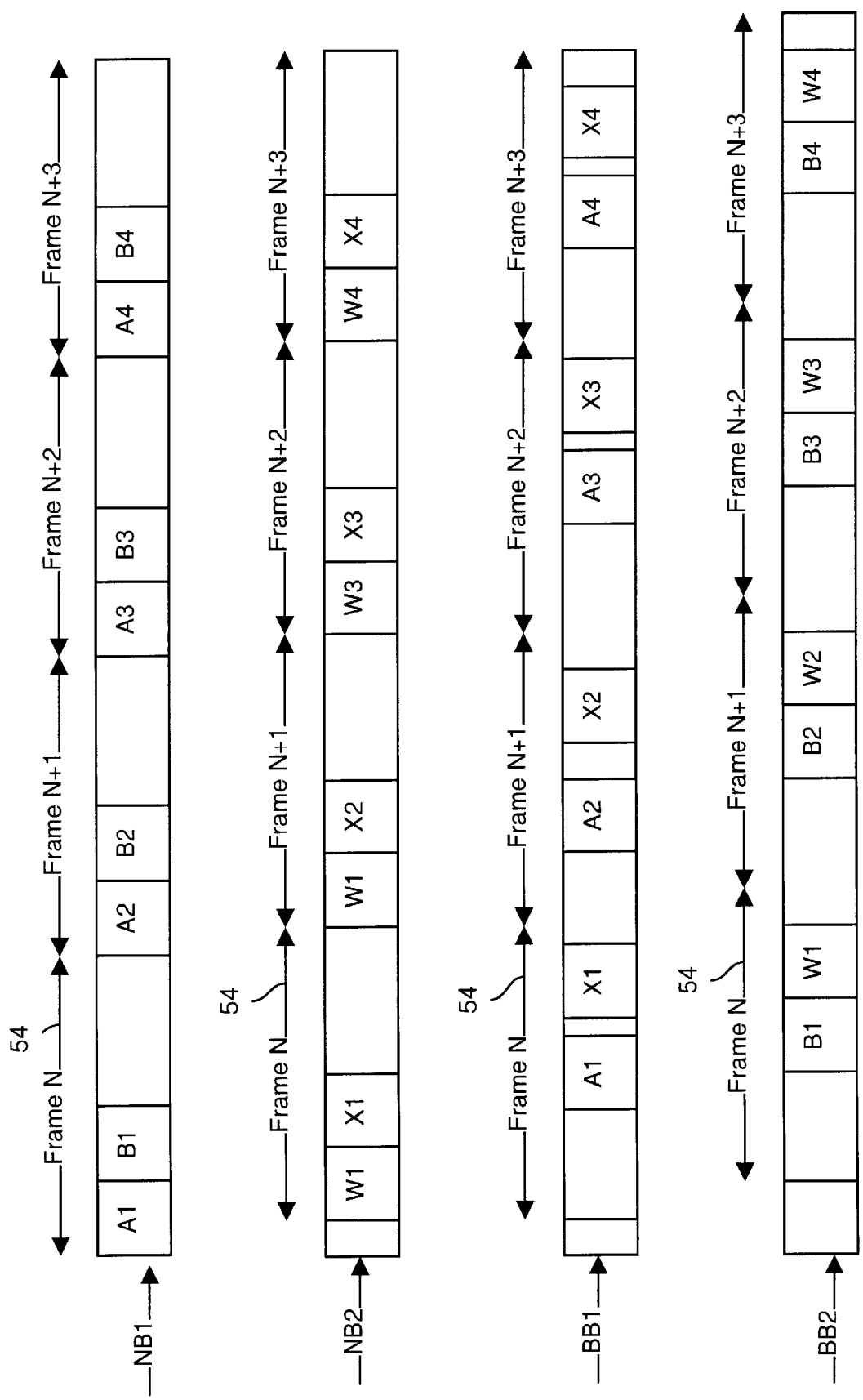
FIG. 8 is a block diagram illustrating the movement of channels between frames in synchronous mapping over the buses of FIG. 6.

FIG. 8 illustrates the operation of the synchronous mapping service 66 by showing how channels, labelled in FIG. 8 as (A1-4,B1-4,W1-4,X1-4), in the frames 54 (N,N+1, ...) on the narrowcast buses NB1 and NB2 are mapped onto channels in the frames 54 on the broadcast buses BB1 and BB2.

In the example of FIG. 8, traffic from modules 32A and 32B on narrowcast bus NB1, and traffic from modules 32W and 32X on narrowcast bus NB2 are repeatedly mapped to the same locations in the frames 54 of the broadcast buses BB1 and BB2. The mapping pattern for this example is provided in Table A1.

TABLE A1

| MAPPING PATTERN | | | |
| --- | --- | --- | --- |
| Narrowcast Bus NB1 | | Narrowcast Bus NB2 | |
| A1 to BB1 | B1 to BB2 | W1 to BB2 | X2 to BB1 |
| A2 to BB1 | B2 to BB2 | W2 to BB2 | X2 to BB1 |
| A3 to BB1 | B3 to BB2 | W3 to BB2 | X2 to BB1 |
| A4 to BB1 | B4 to BB2 | W4 to BB2 | X2 to BB1 |

Figure 9:
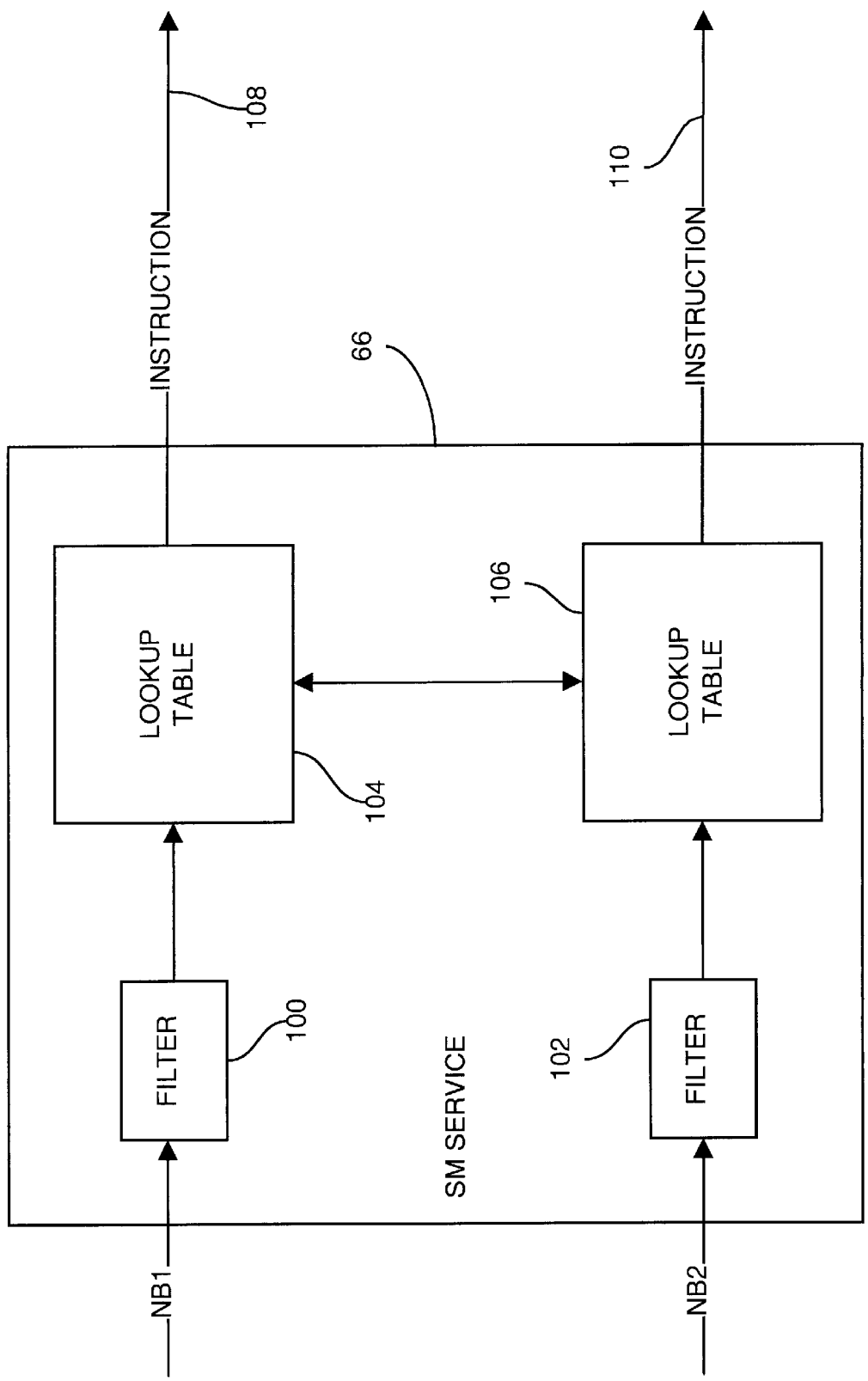
FIG. 9 is a block diagram illustrating the components of the synchronous mapping service of the transport module of the transport layer for a particular module in FIG. 6.

A block diagram of the synchronous mapping service 66 related to the specific example of FIGS. 6–8 is illustrated in FIG. 9. The SM service 66 includes two input filters 100 and 102 and two lookup tables 104 and 106. Input filter 100 receives channel inputs (A1,B1;A2,B2; ... ) from the narrowcast bus NB1, and the input filter 102 receives channel inputs (W1,X1;W2,X2; ... ) from the narrowcast bus NB2. After passing through the filter 100 the channel inputs (from NB1) are processed by the lookup table 104 to produce an instruction 108. Similarly, after passing through the filter 102 the channel inputs (from NB2) are processed by the lookup table 106 to produce an instruction 110. The instructions 108 and 110 may direct the SM service 66 to direct time slot 52 information from a channel to another trunk in the system 90, or to the application layer 44 of a module.

Example-Label Mapping

Label mapping (or asynchronous mapping) refers to a specific time slot 52 or channel 76 that, using a label, is mapped from any location in a narrowcast frame, onto a specific location in a broadcast frame. A label is defined as a header to the channel 76 that includes a route identifier for the channel 76. The mapping is asynchronous since it is derived from the fact that the time slot 52 is mapped based on its label and not its position in the frame 54, hence the mapping is asynchronous relative to the frame 54. Label mapping enables modules to share bandwidth on the trunks 34/36.

Figure 10:
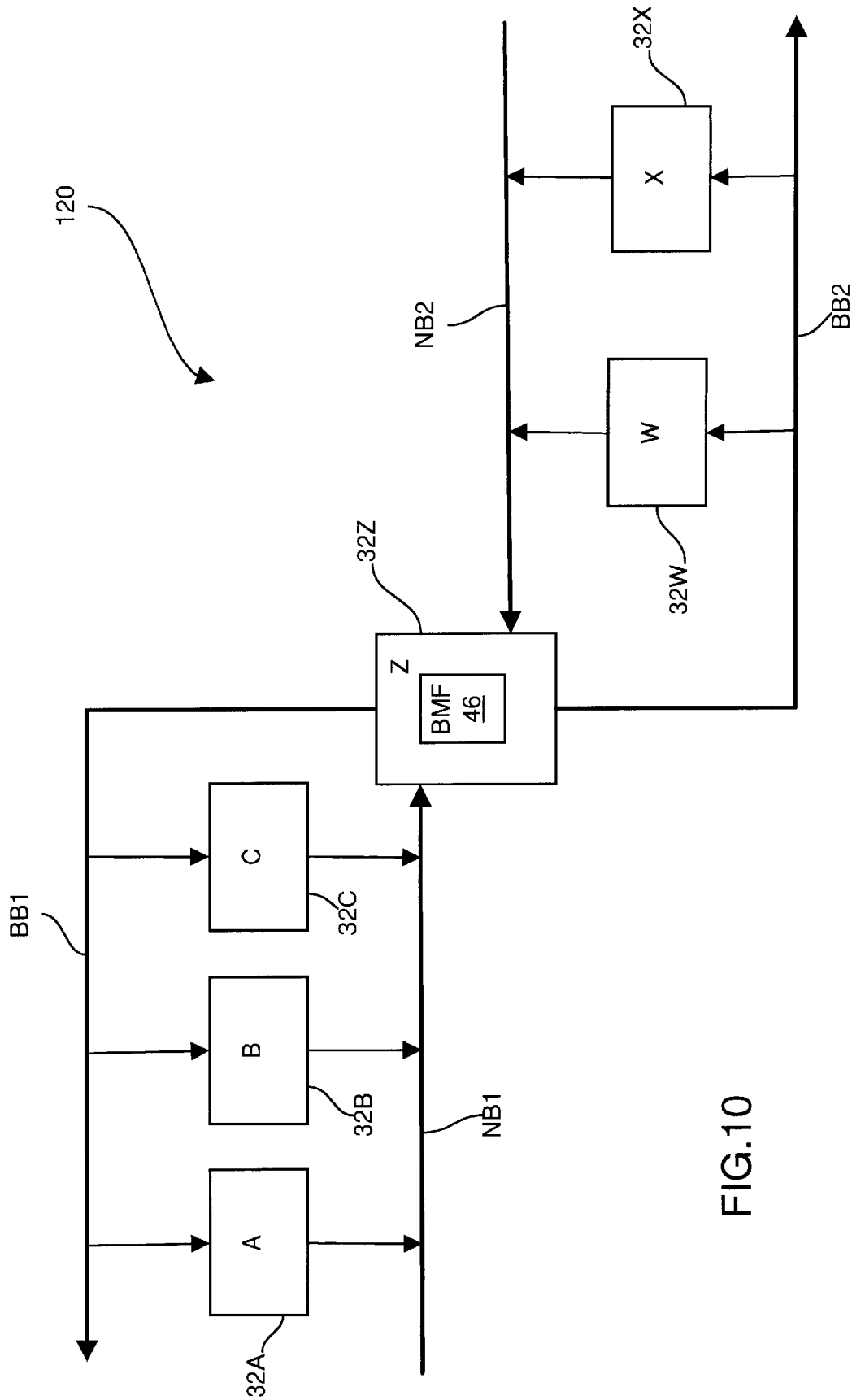
FIG. 10 is a block diagram illustrating a switch topography to describe label mapping.

A packet switch topography 120 incorporating the generic bus system 30 of the present invention is shown in FIG. 10 to illustrate an example of the label mapping. The switch 120 includes a pair of narrowcast buses NB1 and NB2 and a pair of broadcast buses BB1 and BB2 connected to a module 32Z that includes the BMF 46. Modules 32A, 32B and 32C are connected between NB1 and BB1. Modules 32W and 32X are connected between NB2 and BB2. Details of the transport layer 42 of the module 32Z is provided in FIG. 7 discussed above. The clock bus 39 is not shown in FIG. 10 to simplify the drawing.

Figure 11:
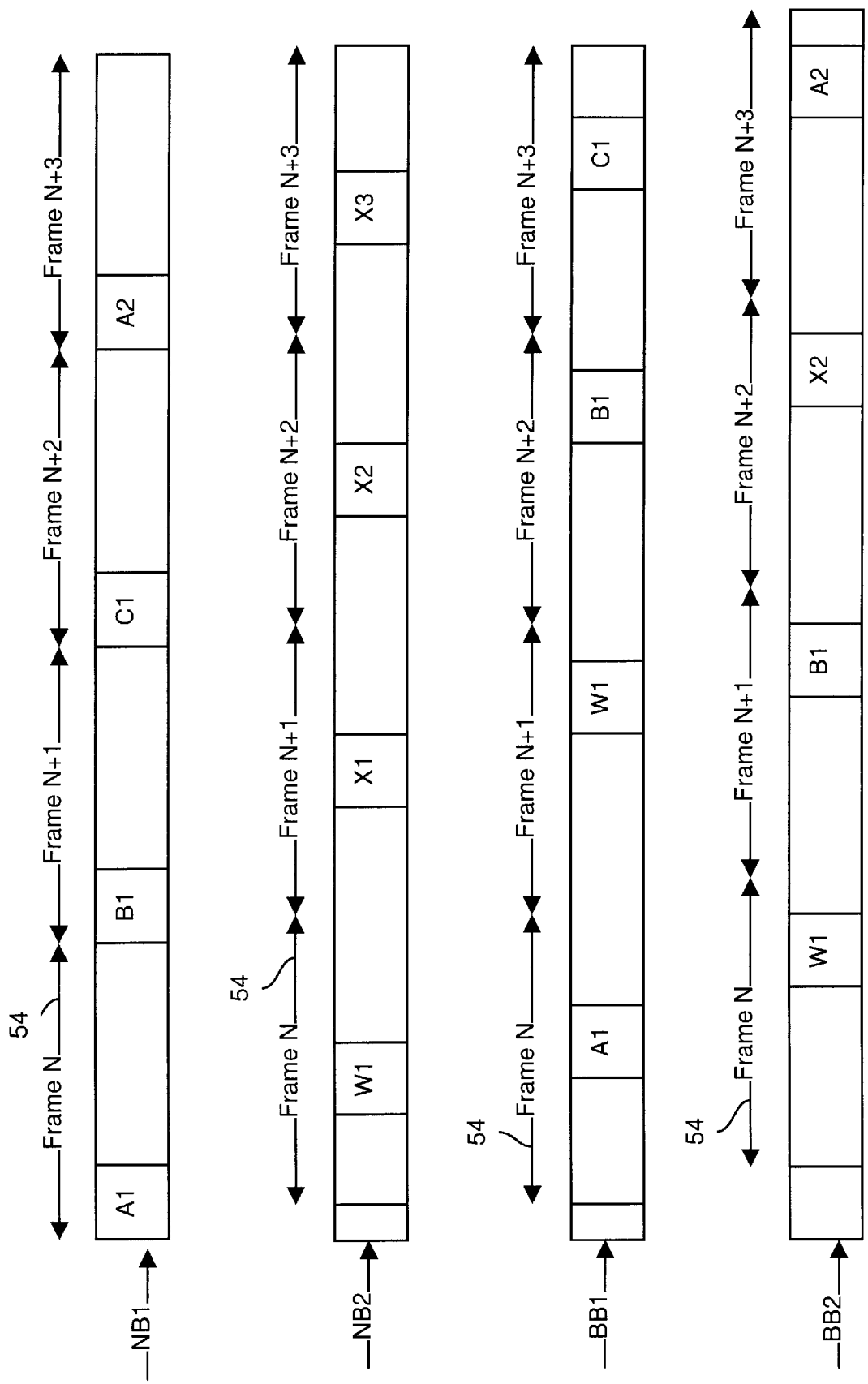
FIG. 11 is a block diagram illustrating the movement of channels between frames in label mapping over the buses of FIG. 10.

FIG. 11 illustrates the operation of the label mapping service 68 by showing how a selected channel, labelled in FIG. 11 as (A1-2,B1,C1,W1,X1-3), in the frame 54 (N,N+1, . . . ) on the narrowcast buses NB1 and NB2 are mapped onto channels in the frame 54 on the broadcast buses BB1 and BB2. In this example, each of the two narrowcast buses NB1, NB2 has an assigned channel to be shared by the modules (32A, 32B, and 32C for NB1 and modules 32W and 32X for NB2). Similarly, each of the two broadcast buses BB1, BB2 has an assigned channel to be shared by the modules (32A, 32B, and 32C for NB1 and modules 32W and 32X for NB2).

The mapping pattern for the example illustrated in FIG. 11 is summarized in Table A2. For example, module 32A issues two strings, a first string A1 in frame N and a second string A2 in frame N+3. String A1 is mapped to the channel on broadcast bus BB1 on frame N, and string A2 is mapped to the channel on broadcast bus BB2 on frame N+3. This shows how module 32A can communicate to two different modules using, from its perspective, the same channel on the buses (BB1 and BB2). For module 32X, it issues X1, X2 and X3 in three consecutive frames over the narrowcast bus NB2. Strings X1 and X3 are terminated in module 32Z, and string X2 is mapped to broadcast bus BB2.

TABLE A2

MAPPING PATTERN

| Narrowcast Bus NB1 | Narrowcast Bus NB2 |
|---|---|
| A1 to BB1 | W1 to BB1 and BB2 |
| A2 to BB2 | X1 terminated in module 32Z |
| B1 to BB2 | X2 to BB2 |
| C1 to BB1 | X3 terminated in module 32Z |

Figure 12:
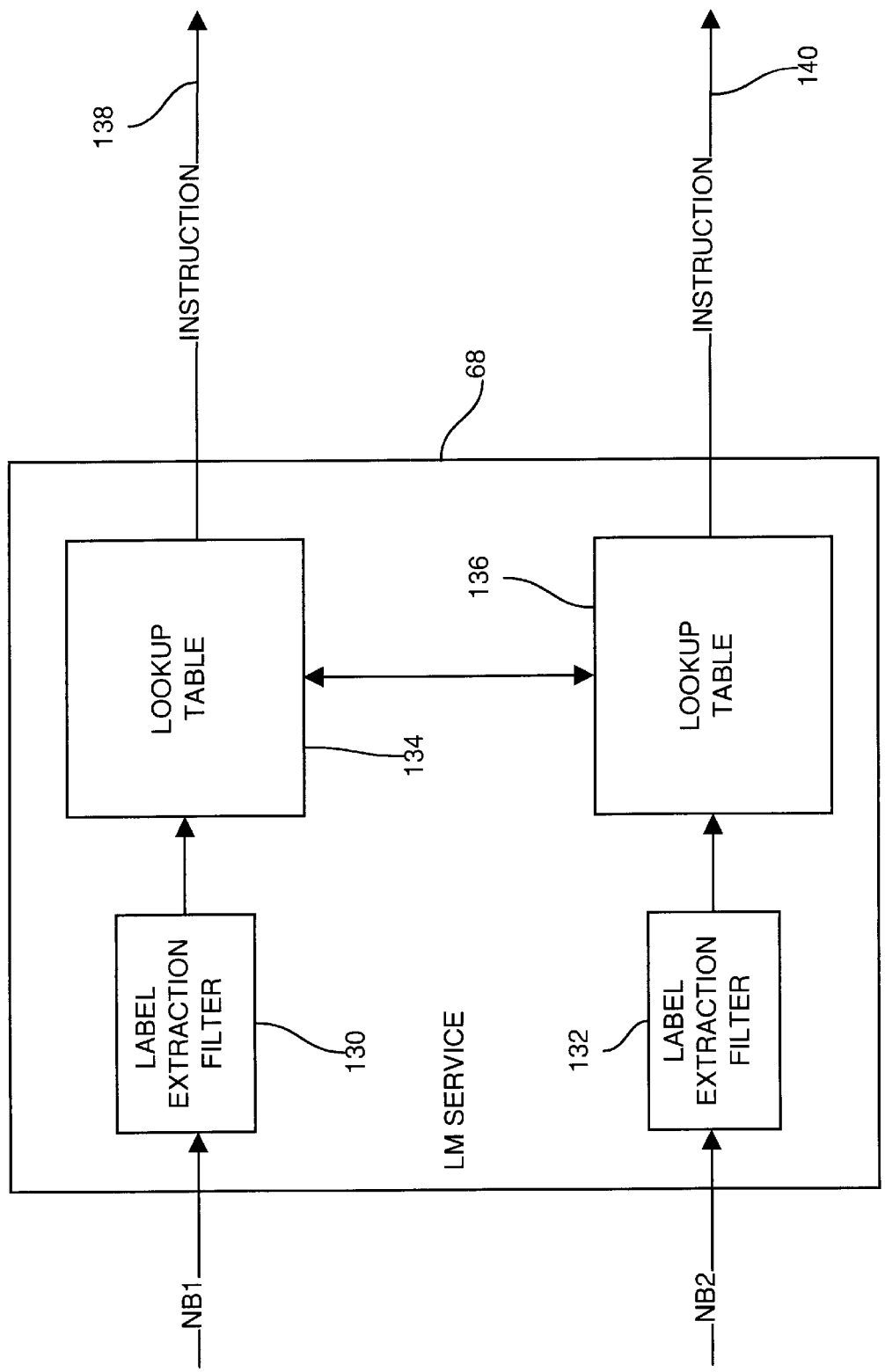
FIG. 12 is a block diagram illustrating the components of the label mapping service of the transport module in the transport layer of a particular module in FIG. 6.

A block diagram of the label mapping service 68 related to the specific example of FIGS. 10–11 is illustrated in FIG. 12. The LM service 68 includes two label extraction filters 130 and 132 and two lookup tables 134 and 136. The filter 130 receives channel inputs (A1,B1,C1,A2) from the narrowcast bus NB1, and the filter 132 receives channel inputs (W1,X1,X2,X3) from the narrowcast bus NB2 and extracts the label associated with each channel. After passing through the filter 130 the labels from the channel inputs (from NB1) are processed by the lookup table 134 to produce an instruction 138. Similarly, after passing through the filter 132 the labels from the channel inputs (from NB2) are processed by the lookup table 136 to produce an instruction 140. The instructions 138 and 140 may direct the LM service 68 to direct time slot 52 information from a channel to another trunk in the system 120, or to the application layer 44 of a module.

Example-Arbitration

Figure 13:
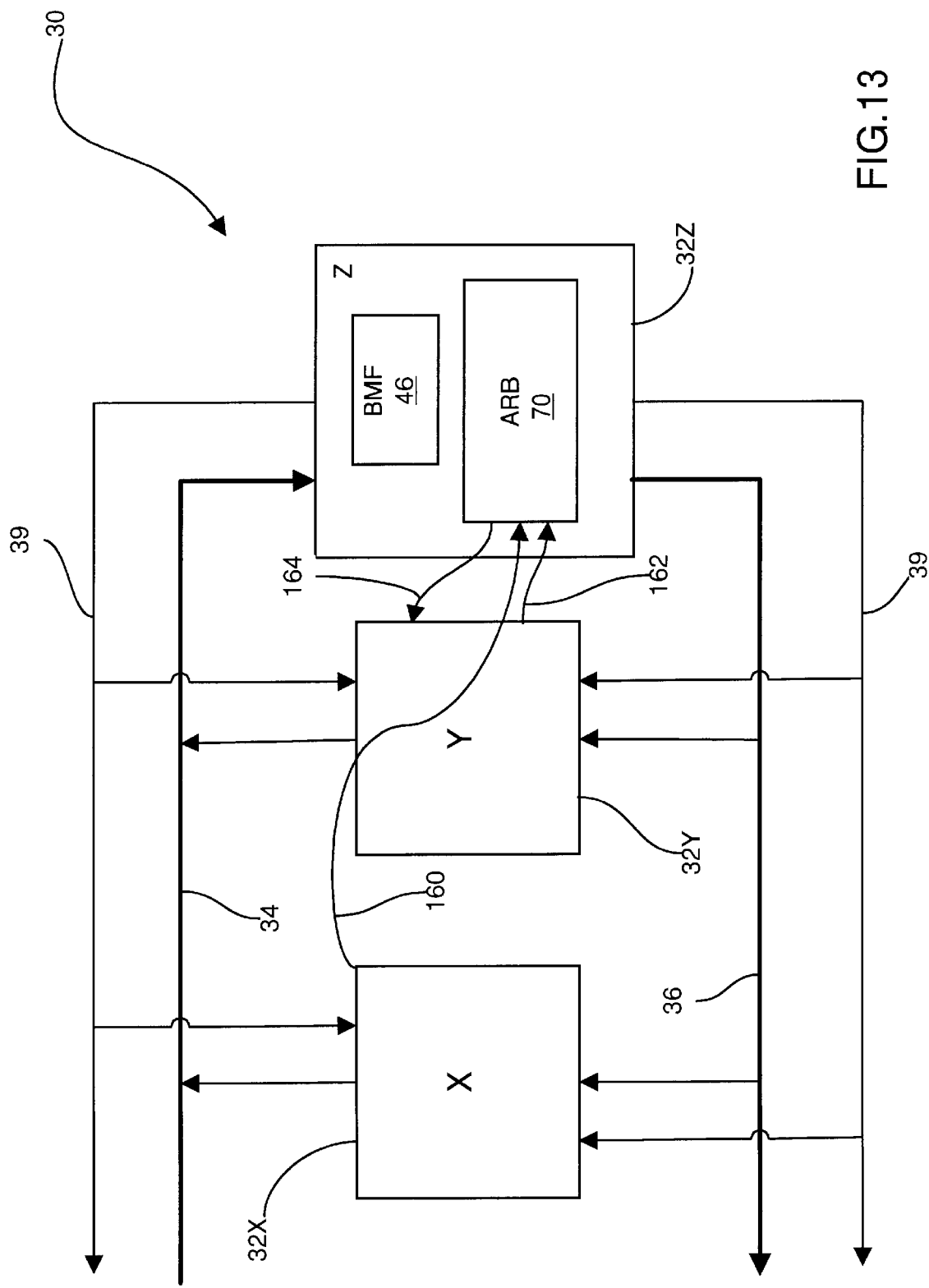
FIG. 13 is a block diagram illustrating a switch topography to describe arbitration during label mapping when two modules share time slots of a channel.

When a channel is mapped using the label mapping approach, it can carry more than one message type by more than one module (i.e. it can be shared as discussed above.) When sharing a channel among two or more modules, the arbitration service 70 is provided to control the granting of the channel between modules. A generalized representation of the arbitration operation is shown in FIG. 13. The arbitration service 70 is based on a request-to-send/clear-to-send (RTS/CTS) message based scheme. Modules 32X and 32Y, transmit a request command 160 and 162, respectively, to the arbitration service 70 of module 32Z that controls the arbitration of shared channels 76 on the trunks 34 and 36. The arbitration service 70 communicates a grant command 164 back to the selected module (i.e. module 32Y in FIG. 13). Each module 32 is assigned a fixed time slot 52 in the frame 54 to place its request command for a shared channel.

For every frame 54, the arbitration service 70 issues at least one grant command 164 against the request commands 160,162 it receives. The grant command 164 a module is placed in a fixed time slot provisioned solely for a specific module. As a result, there is no need to identify the transfer because the request/grant commands are synchronously mapped—i.e. they are identified by their location in the frame).

Figure 14:
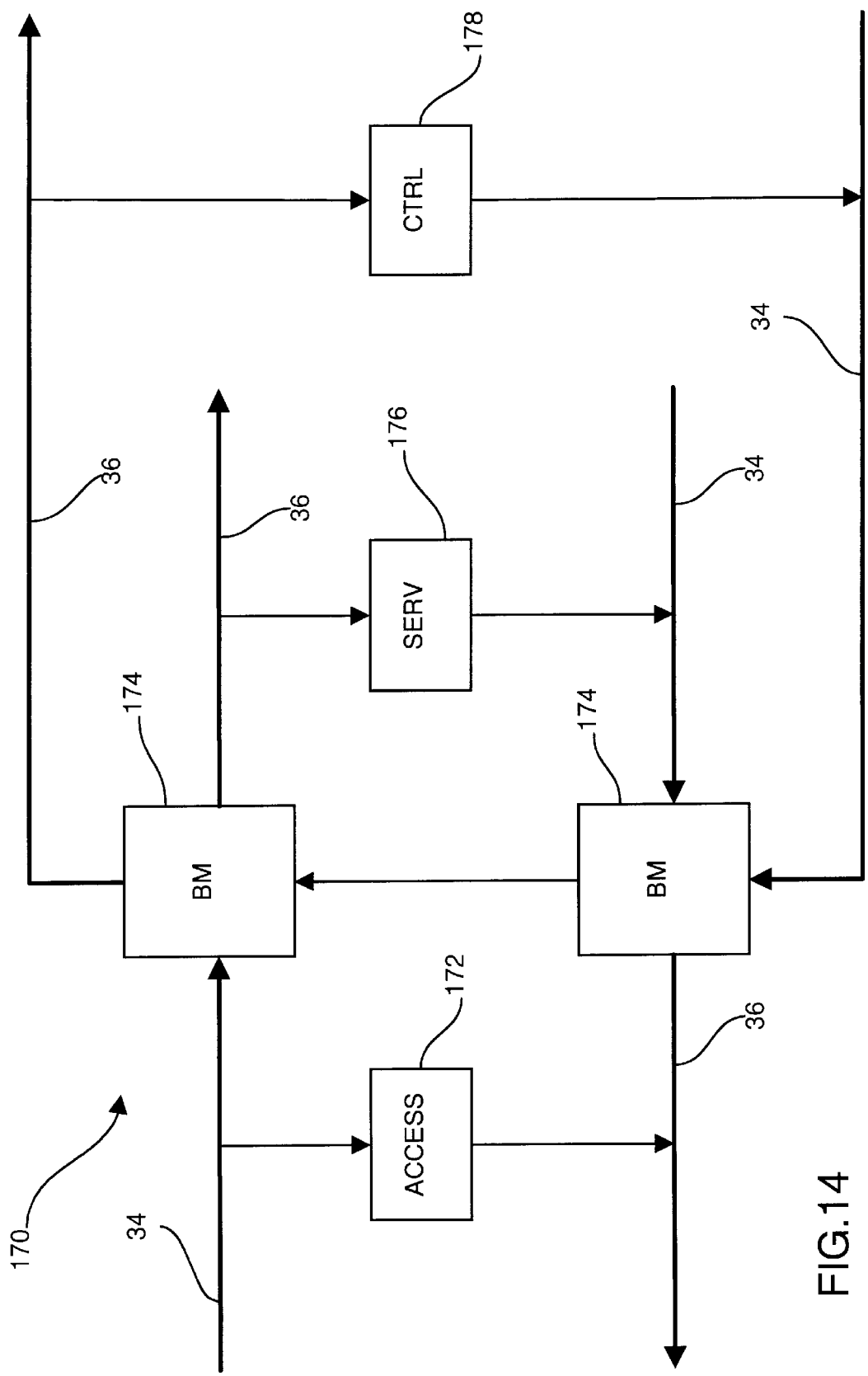
FIG. 14 is a block diagram illustrating a topology for a packet switch incorporating the generic bus system of the present invention.

The generic bus system 30 of the present invention can be used in many applications. An example of a packet switch 170 incorporating the generic bus 30 of the present invention is illustrated in FIG. 14. An "Access" module 172 represents an access function module; a "Ctrl" module 178 represents a control function module; a "serv" module 176 represents a service function module; and a "BM" module 174 represents a bus manager module that includes the bus management function 46.

What is claimed is:

1. A communication system, comprising:

a shared communication bus;

a plurality of modules communicating with one another through the shared communications bus;

means for defining a frame having a plurality of time slots for communicating signals on the bus; and means for specifying a receive assignment definition and a transmit assignment definition;

said receive assignment definition defining a receive channel for each of the plurality of modules representing a set of the time slots, the receive assignment definition including more than one receive channel for at least one of the modules, the sets of the time slots defining the receive channels are distributed, and one of the receive channels is shared by at least two of the modules, wherein said modules respectively receive signals from the bus during the set of time slots prescribed by the receive channel; and said transmit assignment definition defining a transmit channel for each of the modules representing a set of the time slots, the transmit assignment definition including more than one transmit channel for at least one of the modules, the sets of the time slots defining the transmit channels are distributed, and one of the transmit channels is shared by at least two of the modules, wherein said modules respectively transmit signals to the bus during the set of time slots prescribed by the transmit channel; and means for arbitrating communication on the bus between the modules for the shared transmit channel.

2. The communication system of claim 1, wherein said means for arbitrating includes an arbitration service where the modules for the shared transmit channel transmit a request command to the arbitration service and where the arbitration service communicates a grant command back to a selected one of the modules.

3. The communication system of claim 1, wherein each of the modules includes an input frame control map representing the receive assignment definition, and an output frame control map representing the transmit assignment definition.

4. The communication system of claim 1, wherein the means for defining includes a clock bus connected to each of the modules for generating a clock signal and a framing signal to synchronize timing of the modules.

5. The communication system of claim 2, wherein each of the modules includes a transport module in communication with the input frame control map and the output frame control map for mapping receive channels and transmit channels to the modules on the bus.

6. The communication system of claim 3, wherein the means for specifying determines the receive assignment definition and the transmit assignment definition based on requirements of the modules and for populating the input frame control map with the receive assignment definition and the output frame control map with the transmit assignment definition of each of the modules.

7. The communication system of claim 5, wherein the bus includes a narrowcast bus trunk and a broadcast bus trunk wherein each of said modules is connected to both the narrowcast bus trunk and the broadcast bus trunk.

8. The communication system of claim 7, wherein the transport module includes a synchronous mapping service for synchronously mapping transmit channels on the narrowcast bus onto transmit channels on the broadcast bus to facilitate communications between the modules.

9. The communication system of claim 7, wherein the transmit channel includes a label defining a route identifier specifying a mapping location for the transmit channel.

10. The communication system of claim 9, wherein the transport module includes the label mapping service for asynchronously mapping transmit channels on the narrowcast bus onto transmit channels on the broadcast bus based on the label of the transmit channel.

11. The communication system as claimed in claim 10, wherein the transport module includes the arbitration service.

12. A communication system comprising:
a data bus;
a plurality of modules communicating over the data bus;
a clock bus providing a clock signal and a framing signal for defining a frame having a plurality of time slots for communicating signals on the data bus; and
means for specifying a receive assignment definition and a transmit assignment definition;

said receive assignment definition defining a receive channel for each of the modules representing a set of the time slots, the receive assignment definition including more than one receive channel for at least one of the modules, and the sets of the time slots defining the receive channels are distributed;

said transmit assignment definition defining a transmit channel for each of the modules representing a set of the time slots, and one of the transmit channels is shared by at least two of the modules; and means for arbitrating communication on the data bus between the modules for the shared transmit channel, wherein said modules respectively transmit signals to the bus during the set of time slots prescribed by the transmit channel, and one of the receive channels is shared by at least two of the modules.

13. The communication system of claim 12, wherein said means for arbitrating includes an arbitration service where the modules for the shared transmit channel transmit a request command to the arbitration service and where the arbitration service communicates a grant command back to a selected one of the modules.

14. The communication system of claim 12, wherein each of the modules includes an input frame control map representing the receive assignment definition, and an output frame control map representing the transmit assignment definition.

15. The communication system of claim 14, wherein each of the modules includes a transport module in communication with the input frame control map and the output frame control map for mapping receive channels and transmit channels to the modules on the data bus.

16. The communication system of claim 14, wherein the input frame control map is populated with the receive assignment definition and the output frame control map is populated with the transmit assignment definition of each of the modules.

17. The communication system of claim 15, wherein the data bus includes a narrowcast bus trunk and a broadcast bus trunk wherein each of said modules is connected to both the narrowcast bus trunk and the broadcast bus trunk.

18. The communication system of claim 17, wherein the transport module includes the synchronous mapping service for synchronously mapping transmit channels on the narrowcast bus onto transmit channels on the broadcast bus.

19. The communication system of claim 17, wherein the transmit channel includes a label defining a route identifier specifying a mapping location for the transmit channel.

20. The communication system of claim 19, wherein the transport module includes the label mapping service for asynchronously mapping transmit channels on the narrowcast bus onto transmit channels on the broadcast bus based on the label of the transmit channel.

21. The communication system of claims 13 or 20, wherein the transport module includes the arbitration service.

22. A communications apparatus comprising:
a shared communications bus;
a plurality of modules communicating with one another through the shared communications bus;
means for defining a frame having a plurality of time slots for communicating signals on the bus; and
means for specifying a receive assignment definition and a transmit assignment definition, said receive assignment definition defining a receive channel for each of the modules representing a set of the time slots, wherein said modules respectively receive signals from the bus during the set of time slots prescribed by the receive channel, and the receive assignment definition includes more than one receive channel for at least one of the modules, the sets of the time slots defining the receive channels are distributed and one of the receive channels is shared by at least two of the modules;

said transmit assignment definition defining a transmit channel for each of the modules representing a set of the time slots, wherein said modules respectively transmit signals to the bus during the set of time slots prescribed by the transmit channel, and the transmit assignment definition includes more than one transmit channel for at least one of the modules, the sets of the time slots defining the transmit channels are distributed and one of the transmit channels is shared by at least two of the modules; and means for arbitrating communication on the bus between the modules for the shared transmit channel.

23. The communication system of claim 22, wherein said means for arbitrating includes an arbitration service where the modules for the shared transmit channel transmit a request command to the arbitration service and where the arbitration service communicates a grant command back to a selected one of the modules.

24. The communication system of claim 22, wherein each of the modules includes an input frame control map representing the receive assignment definition, and an output frame control map representing the transmit assignment definition.

25. The communication system of claim 24, wherein each of the modules includes a transport module in communication with the input frame control map and the output frame control map for mapping receive channels and transmit channels to the modules on the bus.

26. The communication system of claim 24, wherein the means for specifying determines the receive assignment definition and the transmit assignment definition based on requirements of the modules and for populating the input frame control map with the receive assignment definition and the output frame control map with the transmit assignment definition of each of the modules.

27. The communication system of claim 25, wherein the bus includes a narrowcast bus trunk and a broadcast bus trunk wherein each of said modules is connected to both the narrowcast bus trunk and the broadcast bus trunk.

28. The communication system of claim 27, wherein the transport module includes the synchronous mapping service for synchronously mapping transmit channels on the narrowcast bus onto transmit channels on the broadcast bus.

29. The communication system of claim 27, wherein the transmit channel includes a label defining a route identifier specifying a mapping location for the transmit channel.

30. The communication system of claim 29, wherein the transport module includes the label mapping service for asynchronously mapping transmit channels on the narrowcast bus onto transmit channels on the broadcast bus based on the label of the transmit channel.

31. The communication system of claim 30, wherein the transport module includes the arbitration service.

* * * * *

UNITED STATES PATENT AND TRADEMARK OFFICE
CERTIFICATE OF CORRECTION

PATENT NO. : 6,501,766 B1
DATED : December 31, 2002
INVENTOR(S) : Melhem I. Chaar et al.

It is certified that error appears in the above-identified patent and that said Letters Patent is hereby corrected as shown below:

Title page,
Item [73], Assignee, delete "Northern Telecom Limited, Montreal (CA)" and insert therefor -- Nortel Networks Limited, Montreal (CA) --.

Column 2,
Lines 7 and 38, "which said" should read -- said --.
Line 21, "with different" should read -- using different --.

Column 4,
Line 36, a new paragraph should begin at "FIG. 4B…".
Lines 58-59, "the definitions" should read -- the receive and transmit definitions --.
Line 67, "70" should read -- 76 --.

Signed and Sealed this

Twelfth Day of October, 2004

JON W. DUDAS
*Director of the United States Patent and Trademark Office*